United States Patent Office 3,810,856
Patented May 14, 1974

---

3,810,856
CHLOROPRENE POLYMER PROCESSING
Albert J. Dalhuisen, Sunnyvale, and William H. Deis, Belmont, Calif., assignors to Merck & Co., Inc., Rahway, N.J.
No Drawing. Continuation-in-part of abandoned application Ser. No. 87,318, Nov. 5, 1970. This application Nov. 9, 1972, Ser. No. 305,043
Int. Cl. C08d 9/14
U.S. Cl. 260—23.7 M          42 Claims

ABSTRACT OF THE DISCLOSURE

Improved compounding and processing of chloroprene polymers employing a dispersible form of MgO and pentaerythritol and esters thereof.

---

This application is a continuation-in-part of United States patent application Ser. No. 87,318, filed Nov. 5, 1970, now abandoned.

This invention relates to improvements in the processing of rubber materials. More particularly this invention is concerned with an improved form of magnesium oxide dispersion for use in regulating the scorch and cure rate of neoprene rubber formulations. In addition, the MgO material of this invention results in the production of neoprene vulcanizates of excellent quality.

Neoprene is the generic term applied to the group of synthetic elastomers based on the polymers of chloroprene (2-chloro-1,3-butadiene). The group of general purpose neoprene formulations includes broadly two classes, the sulfur-modified (for example, Type G neoprene) and the nonsulfur-modified (for example, Type W neoprene). It should be understood that this invention is applicable to all types of chloroprene polymers made by polymerization, for example, in the presence of mercaptans or other modifying (chain transfer) agents such as the dialkyl xanthogen disulfides, or in the presence of sulfur, followed by plasticizing treatment, or by very limited polymerization without agents followed by removal of the unchanged chloroprene monomer. All these processes are fully described in the prior art. See for example U.S. Pats. 1,950,436; 2,227,517; 2,234,215; and 2,567,117. Neoprene GNA is an example of a G type of neprene. This particular neoprene is described and its method of manufacture is given at pages 769–771, "Synthetic Rubber," edited by G. S. Whitby [John Wiley and Sons Inc. (1954)].

The polymers of chloroprene used include both polychloroprene itself and blends using a chloroprene polymer. Likewise, materials used with the chloroprene polymers as antioxidants, plasticizers, curing agents, accelerators, retarders, reinforcing agents, pigments and extenders are well known, as are the quantites which should be used under various circumstances. This prior art is applicable in the present invention.

The use of MgO in the processing of neoprene compounds is well-known. The mechanism by which MgO benefits the vulcanization process is not clearly understood, but the influence it exerts has been briefly described in Whitby "Synthetic Rubber" (1954), pages 775–776 (John Wiley) as providing a balance between processing safety and cure rate when the Mgo is combined with other oxides such as zinc oxide. The use of zinc oxide as the sole curing agent produces both a fast cure and a uniform state of cure on extended vulcanization; i.e., such stocks are "flat curing." The limitations of such compounds include a pronounced tendency to be "scorchy," or result in a premature curing of the system. In addition, there results a leveling off of cure at a relatively low point. The use of magnesia as the sole curing agent produces Neoprene compounds which are very slow curing and are safe processing, but in which curing activity tends to persist. In addition, magnesia improves vulcanizate againg properties, presumably by serving as acceptors for the minute amounts of hydrogen chloride which are released from the neoprene during processing curing and vulcanizate aging. In combination, zinc oxide and magnesia supplement each other to produce well-balanced stocks, the properties of which can be varied, frequently to advantage, by adjustment in the ratio of one oxide to the other.

It is the purpose of this invention to provide a synergistic mixture of highly reactive MgO and pentaerythritol and esters thereof for neoprene processing. The synergistic mixture of MgO and pentaerythritol or esters thereof and mixtures thereof of this invention, when employed in the processing of neoprene, result in improved Mooney Scorch Protection (original and after aging of the unvulcanized compound), and provide improved processing and storage safety of unvulcanized neoprene. Furthermore, the synergistic mixture has no adverse effect on the vulcanizate properties of neoprene. This results in less scrap and allows more latitude and flexibility in the processing and storage of the unvulcanized neoprene. This highly active, readily dispersible MgO and pentaerythritol formulation is composed of magnesium oxide and pentaerythritol or esters thereof or mixtures of the alcohol and esters thereof with a dispersing medium consisting of (a) at least one rubber plasticizer or (b) at least one surface active agent or (c) a mixture of at least one rubber plasticizer with at least one surface active agent.

MgO is currently employed in both powder and specified dispersed form for use in neoprene processing. However, the pentaerythritol containing MgO dispersions of the invention result in the preparation of products with improved performance regarding Mooney Scorch Protection (original and after aging) when compared with the MgO preparations that are employed at this time in the rubber industry. The MgO dispersions of this invention may be utilized in either the liquid or solid state in the processing of neoprene. For example, the dispersions may be supplied to the neoprene manufacturer in the form of a paste, bar, stick, block or pellet, etc. in order that the dispersions may be conveniently utilized in the processing of neoprene. The particular form of the MgO dispersion involves a matter of choice and may be prepared using conventional procedures well known to the art.

It is well known in the industry that MgO, upon exposure to atmospheric moisture and carbon dioxide, is rapidly converted to the carbonate or hydroxide. However, neither magnesium carbonate nor magnesium hydroxide are effective in neoprene vulcanization in the manner in which MgO is effective. Accordingly, care must be continuously exercised to insure that the MgO preparation destined for use in neoprene processing does not experience a loss in activity. Another advantage of the dispersions of the invention relates to its ability to maintain the activity of the MgO over considerable periods of storage without employing the precautions normally confronting the industry.

This invention contemplates utilizing the "neoprene grades" of MgO which are precipitated and calcined after precipitation. In addition to these light calcined, highly surface active forms of MgO, less active types of MgO may also be employed in the practice of this invention. Included within this class of less active MgO materials are heavy calcined types of MgO.

The amount of pentaerythritol or esters thereof including mixtures thereof to be employed in the practice of this invention is not critical and may vary between about 2 and 100 parts by weight of pentaerythritol or esters thereof per hundred parts of MgO. The preferred range may vary from about 5 to 25 parts per hundred parts of MgO. The dispersion medium may consist of one of the following: (1) at least one rubber plasticizer; (2) at least one surface active agent; (3) a combination of at least one rubber plasticizer and at least one surface active agent. The amount of dispersing medium is not critical and may vary by weight from about 5 to 200 parts of medium per hundred parts by weight of MgO. When the dispersing medium consists of a mixture of rubber plasticizer and surface active agent the amount of plasticizer and surface active agent may vary within the range of 1% through 99% with relation to the other. In other words, to form an effective dispersing medium one may utilize a mixture of plasticizer and surface active agent wherein the mixture may be predominately rubber plasticizer or predominately surface active agent and all combinations included within such values.

The amount of MgO-pentaerythritol-dispersing medium to be employed in the processing of neoprene will usually vary from about 2 to 16 parts by weight per hundred parts of rubber. This will include systems where the synergistic mixture of MgO and pentaerythritol or esters thereof is used as a processing material both with and without the presence of other metallic oxides. For most applications, the recommended level is 4 phr.

The particular grade of pentaerythritol is not critical and any commercial source of pentaerythritol may be employed in the practice of the invention. For example the pure compound per se as well as a technical grade of pentaerythritol such as Hercules PE-200 having the following specifications is effective in the practice of the invention:

PE-200

Monopentaerythritol content, percent _____ 88±2
Hydroxyl content, percent _____ 48±1
Ash (as Na$_2$SO$_4$), percent _____ 0.01 max.
Total solids, percent _____ 99.5 min.
Color, ASTM Pt-Co _____ 35 max.
Fineness:
    Retained on 200-mesh, percent _____ Nil
    Retained on 325-mesh, percent _____ 1.0 max.

The partial esters of pentaerythritol that are employed in the practice of the invention consist of mono-, di- and tri-esters of pentaerythritol and carboxylic acids.

The acids from which the esters are derived include:

(a) Aliphatic mono- and di-carboxylic acids containing from about 1 carbon atom per acid molecule (formic acid) to 18 carbon atoms (stearic acid).

The acids include saturated (acetic, heptanoic and lauric acids) and unsaturated acids (acrylic, sorbic and oleic acids).

The acids include saturated hydroxy acids (glycoxylic acid) and unsaturated hydroxy acids (ricinoleic acid).

The acids include oxo-acids (glycoxylic and acetoacetic acid).

The acids include saturated di-carboxylic acids (adipic and azelaic acid) and unsaturated di-carboxylic acids (maleic acid).

(b) The following aromatic acids are included: benzoic and phthalic acid.

Representative examples of esters which can be used in this invention are the mono-, di- and tri-esters of pentaerythritol and the following carboxylic acids:

| | |
|---|---|
| Formic | Heptanoic |
| Acetic | Pivalic |
| Acrylic | Nonanoic |
| Glycoxylic | Azelaic |
| Acetoacetic | Glycolic |
| Maleic | Benzoic |
| Adipic | Phthalic |
| Methacrylic | |

The acids which find particular preference in the practice of the invention are fatty acids which contain from about 12–18 carbon atoms and include the following:

| | |
|---|---|
| Oleic | Lauric |
| Stearic | Palmitic |
| Ricinoleic | Linoleic |

Representative examples of specific pentaerythritol esters are as follows:

Pentaerythritol monostearate
    Pentaerythritol distearate
    Pentaerythritol tristearate
    Pentaerythritol monooleate
    Pentaerythritol dioleate
    Pentaerythritol trioleate
    Pentaerythritol monoricinoleate
    Pentaerythritol diricinoleate
    Pentaerythritol triricinoleate
    Pentaerythritol monopalmitate
    Pentaerythritol dipalmitate
    Pentaerythritol tripalmitate
    Pentaerythritol monolaurate
    Pentaerythritol dilaurate
    Pentaerythritol trilaurate
    Pentaerythritol monolinoleate
    Pentaerythritol dilinoleate
    Pentaerythritol monoricinoleate of which the following are of particular interest:

Pentaerythritol monostearate
    Pentaerythritol distearate
    Pentaerythritol tristearate
    Pentaerythritol monooleate
    Pentaerythritol dioleate
    Pentaerythritol monoricinoleate The particular rubber plasticizer that may be employed in the practice of this invention is not critical and includes those plasticizers that are well known and conventionally employed for this purpose by the skilled artisans of the rubber art. In this regard see Morton, "Introduction to Rubber Technology," pages 151–171. Reinhold Publ. Comp. (1964); Murray and Thompson, "The Neoprenes," pages 39–41, DuPont (1963); the plasticizers disclosed therein being incorporated by reference. Included among this class are:

Petroleum oils, such as paraffinic, naphthenic, and aromatic. Resin, waxes, and asphalt derived from petroleum oil are also encompassed within this class. For example, fully refined paraffin waxes may be employed in the practice of the invention. Fully refined paraffin waxes are a hard, white crystalline material derived from petroleum. They are refined by means of a carefully controlled selective solvent process into five different melting point grades, each having exceptional gloss and resistance to blocking. Paraffin waxes are predominately composed of normal, straight chain hydrocarbons. They vary from 18 to 40 carbon atoms and their chain length (i.e., molecular weight) determines their average melting point. Resistance to most acids and alkalis is very good. Illustrative of these waxes are the fully refined waxes: 125/127 AMP, 133/135 AMP, 138/140 AMP, 143/145 AMP and 150 AMP, available from the Mobil Oil Corporation as reported in their technical bulletin RGM-085-011.

A further example of waxes are the microcrystalline waxes as illustrated by the Mobilwax 2300 series as reported in the Mobil Oil Corporation technical bulletin RGM 1-85-001.

Microcrystalline waxes consist of a matrix of extremely small crystals. They are sometimes referred to as amorphous wax—reflecting an early error based on the difficulty of identifying the presence of microscopic crystals. Their molecular structure consists of a complex mixture of hydrocarbons including normal paraffins, branched paraffins, monocyclic mompounds and polycyclic compounds. The optimum ratio of each type of structure is controlled during the refining process to impart desired properties such as adhesive strength, cohesive strength, low temperature flexibility, and resistance to softening at elevated temperatures. Also included are mineral oils;

Esters, such as esters of organic alcohols and polybasic acids;

Resins and polymers, such as aromatic hydrocarbon resins and liquid elastomers (e.g., polyisobutylene and polybutene);

Oils, pitch and resins obtained from pine trees and coal tar.

Natural fats and oils (vegetable oils, blown oils, fatty acids).

Coumarone indene resins (aromatic and aliphatic hydrocarbon resins which are derived from coal and petroleum oils) [Resins in Rubber, Gardner L. Brown, Pennsylvania Industrial Chemical Corp. (1969), p. 104].

As representative members of the petroleum oils one may specifically point to paraffinic petroleum oils such as Cyclolube 2310 (Golden Bear Oil Co.), naphthenic oils such as Shellflex 371 (Shell Chemical Company) and Cyclolube 138 (Golden Bear Oil Company) and aromatic oils such as Bearflex LPO (Golden Bear Oil Company) and Califlux 550 (Golden Bear Oil Company). The esters are exemplified by butyl oleate, dibutylphthalate, and tricresyl phosphate, dioctyl sebacate, trioctyl phosphate and triethylene glycol caprylate. Illustrative of the resins and polymers are Kenflex N (see "Kenflex for Neoprene," a technical bulletin available from Kenrich Corp., Maspeth, N.Y.; Kenflex N is a synthetic polymer of aromatic hydrocarbons which exists as an oily liquid; specific gravity 60/60° F. of 1.01; melting point: 35° F.; flash point COC: 400° F.; yellow to light brown color), BRC–22 (see "Barrett Standard Industrial Chemicals," 1955, published by the Barrett Division of Allied Chemical Corp., New York City; BRC–22 is a solid coal-tar hydrocarbon which does not absorb sulfur; has a softening point of 205 to 220° F.; specific gravity of 1.26 to 1.35 and is 25% to 35% insoluble in $CS_2$), Para-Flux (see "Materials and Compounding Ingredients for Rubber," 1968, p. 184, published by Rubber World, New York City; Para-flux is a polymerized saturated petroleum hydrocarbon available from C. P. Hall; specific gravity, 0.98; black liquid; viscosity (140° F. Saybolt Furol), 250–350 SUS: flash point (COC) 400° F.), Vistanex LM–MH (a non-staining polyisobutylene with a viscosity average molecular weight (Staudinger) of 10,000–11,700), A–C polyethylene and copolymers available from Allied Chemical and reported in their technical data bulletin "A–C Polyethylene" (see below), and the Flosbrenes Fluid SBR polymers which are liquid or fluid copolymers of styrene and butadiene containing approximately 25% bound styrene. Of particular interest in this class is Flosbrene 25 MV which has a molecular weight of approximately 5,000 and a viscosity in poises of 4,500 (77° F.) and 550 (113° F.) [The Flosbrenes Fluid SBR Polymers, A. G. Susie and F. J. Sackfield, American Synthetic Rubber Corp.]. Examples of coumarone indene resins which may be employed in the practice of the invention include the Picco resins which are a family of petroleum derived polyindene or coumarone indene type resins. Of particular interest is Pico 6100-1-½ and Piccotex 100 (alphamethylstyrene vinyl-toluene copolymer) (molar ratio of 1-alphamethylstyrene to 3-vinyltoluene) [Resins in Rubber, supra, pp. 72–75, 86 and Product Data Sheet—079, Pennsylvania Chemical Corp. p. 6]. Illustrative of vegetable oils which may be employed in the compounding of chloroprene polymers are linseed oil, rapeseed oil and safflower oil.

The polybutenes are a series of synthetic hydrocarbon polymers obtained by catalytic polymerization of normal and branched chained butenes. They are pale colored liquids of moderate to high viscosity and tackiness. Representative of the class of polybutenes useful in the practice of the invention are the Oronite polybutenes [New Improved Oronite Polybutenes (1963), California Chemical Corp.]. Of particular interest is Polybutene No. 128.

| | Test method | No. 6 | No. 8 | No. 16 | No. 18 | No. 20 | No. 24 | No. 32X | No. 32 | No. 122 | No. 123 |
|---|---|---|---|---|---|---|---|---|---|---|---|
| Physical Properties: | | | | | | | | | | | |
| Condition | Visual | Clear, bright and free from sediment or suspended matter. | | | | | | | | | |
| Color, Gardner | ASTM D-1544 | 1 | 1 | 1 | 1 | 1 | 1 | 1 | 1 | 1 | 1 |
| Specific gravity at 60/60° F. | ASTM D-287 | 0.846 | 0.862 | 0.880 | 0.888 | 0.891 | 0.898 | 0.905 | 0.908 | 0.915 | 0.917 |
| Number average molecular weight Mechrolab Osmometer. | SM-180-6 | 330 | 440 | 640 | 730 | 800 | 950 | 1,260 | 1,400 | 2,500 | 2,700 |
| Molecular weight dispersion index. | SM-180-6 | | 1.0 | | | | 1.5 | 1.6 | 1.8 | | 2.3 |
| Viscosity at 100° F., SSU | ASTM D-445 & D-446 | 134 | 560 | 5,700 | 9,500 | 16,500 | 40,000 | 104,000 | 123,000 | 715,000 | 890,000 |
| Viscosity at 210° F., SSU | ASTM D-445 & D-446 | 41 | 63 | 250 | 350 | 550 | 1,050 | 2,460 | 2,990 | 15,800 | 19,500 |
| Viscosity index | ASTM D-567 | 66 | 87 | 96 | 103 | 105 | 112 | 116 | 118 | 122 | 122 |
| Flash point, ° F | ASTM D-92 | 270 | 280 | 335 | 335 | 370 | 400 | 485 | 435 | 500 | 510 |
| Fire point, ° F | ASTM D-92 | 295 | 320 | 390 | 415 | 430 | 470 | 560 | 520 | 605 | 615 |
| Pour point, ° F | ASTM D-97 | −60 | −30 | −10 | +5 | +10 | +20 | +35 | +40 | +55 | +65 |
| Loss on heating, percent (5 hours at 325° F.). | ASTM D-6 | | 7.6 | | | | 1.0 | 0.3 | 0.4 | | 0.1 |
| Coefficient of thermal expansion per ° C. (15° C–100° C.). | SM-15-23 | 0.00079 | 0.00078 | 0.00074 | 0.00072 | 0.00072 | 0.00070 | 0.00067 | 0.00066 | 0.00063 | 0.00062 |
| Chemical properties: | | | | | | | | | | | |
| Bromine number, g./100. g | SM-20-28 | 44 | 37 | 26 | 24 | 22 | 18 | 14 | 13 | 8 | 7 |
| Neutralization value, mg. KOH/g. | ASTM D-664 | 0.01 | 0.01 | 0.01 | 0.01 | 0.01 | 0.01 | 0.01 | 0.01 | 0.01 | 0.01 |
| Organic chloride as chlorine, weight percent. | SM-205-12 | 0.007 | 0.004 | 0.003 | 0.003 | 0.003 | 0.003 | 0.003 | 0.003 | 0.002 | 0.002 |
| Inorganic chlorides and sulfates. | ASTM D-878 | None | None | None | None | None | None | None | None | None | None |
| Total sulfur, percent | ASTM D-1552 | 0.01 | 0.01 | 0.01 | 0.01 | 0.01 | 0.01 | 0.01 | 0.01 | 0.01 | 0.01 |
| Carbon residue, percent | ASTM D-189 | None | None | None | None | None | None | None | None | None | None |
| Water content, p.p.m | ASTM D-1533 | 40 | 40 | 40 | 40 | 40 | 40 | 40 | 40 | 40 | 40 |

As indicated above, mixtures of various plasticizers may be employed in the practice of the invention in addition to a single member. It has been found that desirable results are obtained when mixtures are employed, particularly when one of the members of the plasticizer mixture is either a liquid elastomer such as polyisobutylene, polybutene or the Flosbrenes or a coumarone indene resin such as Picco 6100–1-1/2 or Piccotex 100. The addition of the above plasticizers to the MgO dispersions improves the mixing and extrusion characteristics of the dispersion without affecting the dispersion performance in neoprene. When the liquid elastomers and coumarone indene resins are employed in combination with other plasticizers, they may be used at .4–20 parts by weight per hundred parts by weight of MgO.

The properties of typical petroleum oils which are employed as plasticizers are as follows:

SHELLFLEX 371

| | |
|---|---|
| Viscosity: | |
| SSU/100° F. | 420 |
| SSU/210° F. | 53.1 |
| Gravity, ° API | 26.1 |
| Specific gravity/60° F. | 0.8978 |
| Pounds/gallon | 7.476 |
| Color, ASTM | L0.5 |
| Flash point, c.o.c., ° F. | 420 |
| Pour point, ° F. | −25 |
| Volatility, 22 hrs./225° F. percent w. | 0.62 |
| Neutralization No., mg. KOH/g. | 0.03 |
| Distillation, ° F.: | |
| IBP | 710 |
| 5% | 745 |
| 10% | 757 |
| 50% | 810 |
| 90% | 865 |
| Aniline point, ° F. | 209 |
| UV absorptivity @ 260 mµ | 0.9 |
| Viscosity-gravity constant | 0.840 |
| Refractive index/20° C. | 1.4890 |
| Refractivity intercept | 1.0423 |
| Molecular analysis, clay-gel, percent w.: | |
| Asphaltenes | 0 |
| Polar compounds | 0.3 |
| Aromatics | 15.5 |
| Saturates | 84.2 |
| Carbon atom analysis, percent: | |
| Aromatic carbon atoms, $C_A$ | 2 |
| Naphthenic carbon atoms, $C_N$ | 44 |
| Paraffinic carbon atoms, $C_P$ | 54 |
| ASTM rubber extending oil type | 4 |

PICCOTEX 100

| | |
|---|---|
| Softening point, ball-and-ring _____° C__ | 100 |
| Color, Gardner scale (maximum) | 1 |
| Specific gravity | 1.04 |
| Pounds per gallon, solid resin | 8.67 |
| Gardner viscosity, in toluene at 25° C. | (¹) |
| Acid number | Less than 1 |
| Saponification number | Less than 1 |
| Bromine number (electrometric) | Less than 1 |
| Ash percent | Less than 0.1 |
| Refractive index at 25° C. | 1.583 |
| Ozone number | 0 |
| Flash point, ° F. | 505 |
| Fire point, ° F. | 570 |

¹ Q at 70% solids.

PICCO 6100-1-1/2

Petroleum hydrocarbon resin (produced by the homo- and copolymerization of dienes and olefins of the aliphatic, alicyclic, and monobenzenoid arylalkene types from distillates of cracked petroleum stocks)

| | |
|---|---|
| Color, coal tar; max. | 1½ |
| Melting point,¹ deg. C. | 100 |
| Specific gravity | 1.06 |
| Bromine No. (elec.) | 10.3 |
| Iodine No. (corrected) | 16.4 |
| Refractive index, 25° C. | 1.60 |
| COC flash point, ° F. | 480 |
| Acid number, max. | 1 |
| Saponification No., max. | 1 |

¹ Ring and ball method.

| | Califlux 550 | Bearflex LPO | Cyclolube 138 | Cyclolube 4053 | Cyclolube 2310 |
|---|---|---|---|---|---|
| Specific gravity 60° F | 1.0217 | 0.9679 | 0.9573 | 0.9053 | 0.9236 |
| ° API gravity | 7.0 | 14.7 | 16.3 | 24.8 | 21.7 |
| Color, ASTM D-1500 | D8.0 | 2.0 | 5 | 3.0 | 3.0 |
| Viscosity, SUS at 100° F | 313,000 | 130 | 2,500 | 539 | 1430 |
| Viscosity, SUS at 210° F | 475 | 38.1 | 86.3 | 56.6 | 78.9 |
| Pour point, ° F | 90 | −35 | 15 | −20 | 10 |
| Flash point, COC, ° F | 465 | 310 | 425 | 400 | 435 |
| Fire point, COC, ° F | 515 | 370 | 470 | 455 | 500 |
| Aniline point, ° F | | 59.0 | 158 | 204.1 | 195.4 |
| Mixed aniline point, ° F | 95.8 | | | | |
| Average molecular weight | 435 | 255 | 411 | 436 | 410 |
| Refractive index 20° C | 1.5843 | 1.5422 | 1.5294 | 1.4936 | 1.5043 |
| Molecular analysis, ASTM D-2006 (Rostler): | | | | | |
| Asphaltenes | None | None | None | None | None |
| Nitrogen bases | 31 | 2 | 10 | 1 | 2 |
| First acidaffins | 22 | 17 | 14 | 4 | 9 |
| Second acidaffins | 38 | 63 | 37 | 26 | 33 |
| Paraffins | 9 | 18 | 39 | 69 | 56 |
| Gel aromatic | 91 | 82 | 61 | 31 | 44 |
| Molecular analysis, ASTM D-2007 (Clay-Gel): | | | | | |
| Asphaltenes | None | None | None | None | None |
| Polar compounds | 28 | 3 | 10 | 1 | 2 |
| Aromatics | 63 | 77 | 50 | 26 | 40 |
| Saturates | 9 | 20 | 40 | 73 | 58 |
| Neutratiztion number | 0.04 | 0.03 | 0.04 | 0.04 | 0.03 |
| Viscosity index | −1146 | −104 | −56 | 43 | 18 |
| Viscosity-gravity constant | 0.9667 | 0.9520 | 0.9020 | 0.8426 | 0.8653 |
| Refractive intercept | 1.0748 | 1.0548 | 1.0526 | 1.0444 | 1.0463 |
| n-d-M: | | | | | |
| Percent $C_A$ | 54 | 38 | 23 | 6 | 10 |
| Percent $C_N$ | 7 | 34 | 37 | 40 | 43 |
| Percent $C_P$ | 39 | 28 | 40 | 54 | 47 |
| Lbs wt./gal | 8.6 | 8.0 | 7.9 | 7.5 | 7.7 |

The properties of typical mineral oils that are well known as plasticizers are as follows:

| Grade No. | Specific gravity at 15.5° C. or 60° F. | Saybolt viscosity at 37.8° C. or 100° C. | Kinematic viscosity (centistokes) at 37.8° C. or 100° F. | Engler viscosity 20° C. | Engler viscosity 50° C. | ASTM pour pt. (max.) ° C. | ASTM pour pt. (max.) ° F. | Flash pt. COC (min.) ° F. |
|---|---|---|---|---|---|---|---|---|
| 350 USP | .880/.895 | 345/355 | 74/77 | 32.0 | 5.6 | −23 | −10 | 430 |
| 85 NF | .845/.860 | 80/90 | 15/18 | 5.0 | 2.0 | −7 | +20 | 370 |

TYPICAL PROPERTIES OF A-C POLYETHYLENES AND COPOLYMERS

| | Softening point (ASTM E-28) | | Hardness, dmm. (ASTM D-5) | Density, g./cc. (ASTM D-1505) | Viscosity— cps. 284° F. (140° C.) (Brookfield) | Percent vinyl acetate |
|---|---|---|---|---|---|---|
| | ° F. | ° C. | | | | |
| Non-emulsifiable grades: | | | | | | |
| A-C polyethylenes: | | | | | | |
| 1702 | 185 | 85 | 90 | 0.88 | 40 | |
| 617 and 617A | 215 | 102 | 7.5 | 0.91 | 145 | |
| 6 and 6A | 222 | 106 | 3.5 | 0.92 | 200 | |
| 7 and 7A | 225 | 107 | 3.0 | 0.92 | 220 | |
| 8 and 8A | 240 | 116 | 1.0 | 0.93 | 350 | |
| 612 | 226 | 108 | 3.5 | 0.90 | 1,500 | |
| 615 | 228 | 109 | 2.5 | 0.92 | 4,000 | |
| A-C copolymers (EVA type): | | | | | | |
| 405 | 205 | 96 | 9.5 | 0.91 | 230 | 5 |
| 400 | 204 | 95 | 8.0 | 0.92 | 500 | 14 |
| Emulsifiable grades: | | | | | | Acid No. |
| A-C polyethylenes: | | | | | | |
| 656 | 205 | 96 | 12 | 0.92 | 120 | 15 |
| 629 and 629A | 219 | 104 | 5.5 | 0.93 | 200 | 15 |
| 655 | 225 | 107 | 2.5 | 0.93 | 210 | 15 |
| 680 | 230 | 110 | 1.5 | 0.94 | 250 | 16 |
| 392 | 280 | 138 | 0.5 | 0.99 | 9,000 | 28 |
| A-C copolymer (organic acid type): 540 | 226 | 108 | 2.0 | 0.93 | 500 | 40 |

The surface active agents contemplated within the scope of this invention are either nonionic or ionic or mixtures thereof. As illustrative of classes of well known materials one may refer to the following:

Nonionic agents

Sorbitan fatty acid esters,
Polyoxyethylene sorbitan fatty acid esters,
Polyoxyethylene sorbitol esters,
Polyoxyethylene acids,
Fatty alcohols,
Polyethylene glycols,
Nonylphenoxypoly (ethyleneoxy) ethanols,
Fatty acid esters of: glycerol, ethylene glycol, polyethylene glycol, propylene, glycol,
Tetra esters of pentaerythritol and fatty acids.

Ionic agents

Alkyl aryl sulfonates (e.g., dodecylbenzene sulfonate such as Atlas G-3300)

Metallic soaps

Representative examples of metallic soaps or fatty acid esters of metals that fall within the scope of the present invention are the stearates, oleates, palmitates and octoates of Ca, Al, Mg, and Fe. Other metals which may be utilized are Zn, Cd, Ba, Pb, Na, K, Li and Ni. Preferred examples of the metallic soaps are Mg stearate, Ca stearate, Al stearate, Fe distearate and Fe tristerate.

It should be noted that the choice of a specific surface active agent is not critical to the practice of the invention, as long as it be either nonionic or ionic and does not interfere with the neoprene vulcanization. Representative surface active agents include the following:

NONIONIC AGENTS

| Compound name | Class |
|---|---|
| Span 40, sorbitan monopalmitate | Sorbitan fatty acid ester. |
| Span 80, sorbitan monooleate | Do. |
| Span 85, sorbitan trioleate | Do. |
| Tween 20, Polyoxyethylene (20) | Sorbitan monolaureate.[1] |
| Tween 40, polyoxyethylene (20) | Sorbitan monopalmitate.[1] |
| Tween 60, polyoxyethylene (20) | Sorbitan monostearate.[1] |
| Tween 80, polyoxyethylene (20) | Sorbitan monooleate.[1] |
| Renex 20, polyoxyethylene esters of mixed fatty and resin acids. | Polyoxyethylene acids. |
| Tergitol NPX | Nonylphenyl polyglycol ether. |
| Tergitol 15-S-9 | Linear alcohol polyglycol ether. |
| Emulphor VN-430 | Polyoxyethylated fatty acid. |
| Igepal CO-430 | Nonylphenoxypoly(ethyleneoxy) ethanol. |
| Glycerol monostearate | Fatty acid ester of glycerol. |
| Glycerol tristearate | Do. |
| Cetyl stearyl alcohol | Fatty alcohol. |
| Carbowax 4000 | Polyethylene glycol. |
| Epolene E-14 | Modified low molecular weight polyethylene. |
| Ganex V-216 | Modified poly (vinylpyrrolidone). |

IONIC AGENTS

| Atlas G-3300 | Alkyl aryl sulfonate. |
|---|---|

[1] Polyoxyethylene sorbitan fatty acid esters.

For further embodiments of nonionic and ionic agents that may be employed in the practice of this invention, attention is invited to publications such as "General Characteristics of Atlas Surfactants" (1963) and Detergents and Emulsifiers 1969 Annual, edited by John W. McCutcheon; the nonionic and ionic agents disclosed therein being incorporated by reference.

Representative examples of combinations of surface active agents include the following (the preferred ratio of the ingredients is indicated in parenthesis):

Span 80/Tween 60 (50/50)
Span 80/Tween 80 (60/40)
Span 80/Tween 80/ethylene glycol monostearate (25/25/50)
Span 80/Tween 80/glycerol monostearate (40/30/30)
Span 80/Tween 80/epolene E-14 (20/15/65)
Span 80/Tween 80/Ca stearate (40/30/30)
Span 80/Tween 80/carbowax 4000 (40/30/30)
Span 80/Ca stearate (60/40)
Span 80/Al stearate (60/40)
Igepal CO-430/Ca stearate (67/33)
Igepal CO-430/Al stearate (67/33)

Although the precise reasoning for the highly improved results achieved by the dispersions of this invention containing a synergistic mixture of MgO and pentaerythritol or esters thereof is not entirely understood, it is thought that the beneficial effects may be due to pentaerythritol or its esters, in the presence of MgO, having a stabilizing effect on the polymer.

The pentaerythritol containing MgO dispersions of the invention may be prepared employing procedures well known in the art. An effective method involves dispersing the MgO and pentaerythritol in the dispersing medium by vigorous mixing. High shear mixing is desirable. The dispersion can be made at room temperature, but elevated temperatures (80°–120° C.) are preferred. It may be noted that particle size reduction of the MgO (prior to, after, or during making the dispersion) improves the dispersion performance.

All dispersions used in the following examples were prepared in a double arm sigma blade mixer. The mixer has a working capacity of 0.7 gal, and is jacketed for steam heating. The dispersions were prepared by adding all ingredients including pentaerythritol but except MgO, and mixing with heating until a temperature of 100–105° C. was reached, then the MgO was added and mixing was continued at 100–105° C. until complete wetting of the MgO and the pentaerythritol by the dispersing medium.

The neoprene compounding was done on a two-roll laboratory rubber mill. The rubber mill has a front roll and a back roll, each six inches in diameter and thirteen inches in length. The front roll is operated at 24 revolutions per minute, and the back roll is operated at 33.6 revolutions per minute. A 7.5 horsepower motor is used to operate the mill. The composition of the neoprene rubber used in the following examples is as follows:

Neoprene rubber

| | Parts |
|---|---|
| Neoprene GNA | 100 |
| Stearic acid | 0.5 |
| MgO powder or dispersion (with or without pentaerythritol) | 4 |
| SRF carbon black | 29 |
| Neozone A (N-phenyl-α-naphthylamine, antioxidant) | 5 |
| ZnO | 5 |

The rubber is banded on the front roll of the laboratory mill, and the mill is operated until the band is smooth and free of holes. In succession, stearic acid, MgO (powder or dispersion), carbon black, Neozone A and ZnO are added. Each ingredient is added evenly across the rolls and at a uniform rate and is assimilated into the mix before the next ingredient is added. After mixing, the batch is removed from the mill, weighed, and again placed into the mill. The rolls are set at a distance of 0.030 inch from each other. The stock is passed through the mill six times. During the milling, water having a temperature of 68° F. is passed through the rolls. The stock is then sheeted from the mill.

Mooney scorch performance was determined with a Monsanto Mooney rheometer at 127° C. using a small rotor according to ASTM Test Method D1646–63.

The "Neoprene Grade" MgO used in the following examples is Maglite D No. 3231, a light calcined, high surface activity, magnesium oxide produced by Merck & Co., Inc. It has the following typical properties:

Chemical analysis

| | Typical, percent |
|---|---|
| Magnesium oxide, MgO | 93.10 |
| Ignition loss | 4.86 |
| Carbon dioxide, $CO_2$ | 0.46 |
| Combined water, $H_2O$ | 4.40 |
| Calcium oxide, CaO | 0.79 |
| Silicon dioxide, $SiO_2$ | 0.27 |
| Chloride, Cl | 0.17 |
| Sulfate, $SO_3$ | 0.68 |
| Iron oxide, $Fe_2O_3$ | 0.03 |
| Aluminum oxide, $Al_2O_3$ | 0.10 |
| Manganese, Mn | 0.0017 |
| Copper, Cu | 0.0002 |
| Acid insoluble | 0.05 |

Physical analysis

| | Typical |
|---|---|
| Appearance | (1) |
| Refractive index | 1.64 |
| Specific gravity | 3.32 |
| Weight per gallon lb./gal | 2.8 |
| Bulk (loose) pcf | 21 |
| Screen analysis: | |
| Through 100 mesh percent | 100 |
| Through 200 mesh do | 100 |
| Through 325 mesh do | 99.5 |

1 Clean, white, odorless powder.

Primary

Particle size, as determined by an electron microscope:

| | |
|---|---|
| Average distribution microns | 0.086 |
| 0–0.05 micron percent | 20.9 |
| 0.05–0.10 micron do | 48.8 |
| 0.10–0.15 micron do | 20.2 |
| 0.15–0.20 micron do | 7.1 |
| 0.20–0.25 micron do | 3.0 |
| Surface area $m.^2/gm.$ | 185 |
| Iodine number | 135 |

The dispersions were compounded in a neoprene rubber formulation indicated previously using a laboratory mill; they were used at 4 phr. (parts per 100 of rubber). For comparison, Maglite D powder was similarly compounded, and used at 4 phr.

The performance of the dispersions and powder additions to the neoprene compound was judged from Mooney scorch $t_{10}$ times. The $t_{10}$ is the time required for the Mooney viscosity to increase 10 units above the minimum. Desirably, the $t_{10}$ times for original Mooney Scorch should be relatively long (similar to what results from the use of Maglite D powder at 4 phr.). Next, the unvulcanized compounds were aged during 6 days at 50° C., after which the Mooney viscosity $t_{10}$ time was determined. Desirably, the $t_{10}$ time should change little during bin aging. If the $t_{10}$ times of the original or the bin aged compounds are short, then the rubber processor does not have sufficient time to process and vulcanize his compounds. This results in scrap. Relatively high $t_{10}$ times reduce losses due to scrap and allow less critical conditions for processing and storage of the unvulcanized neoprene compounds.

EXAMPLE I

In this example the performance of a MgO dispersion with pentaerythritol (reagent grade) is compared to a similar dispersion without this synergistic additive, using mineral oil as the dispersing medium. The dispersions were used at 4 phr. in neoprene.

| Dispersion composition (weight percent) | | | Original and bin age Mooney scorch protection $t_{10}$ time (minutes) | |
|---|---|---|---|---|
| Maglite D | Pentaerythritol | Mineral oil | Original | After 6 days at 50° C. |
| 50 | | 50 | 34 | 18 |
| 40 | 10 | 50 | 44 | 28 |

The results clearly show the beneficial synergistic effect produced by pentaerythritol.

EXAMPLE II

In this example the dispersions are made in a dispersing medium consisting of a naphthenic petroleum oil (Shellflex 371), a surface active agent (nonylphenoxypoly (ethyleneoxy) ethanol) and a metallic soap (calcium stearate). The performance with and without pentaerythritol (technical grade) is compared with Maglite D powder. The dispersions and the powder are each used at 4 phr. in neoprene:

| Dispersion composition (weight percent) | | | | | Original and bin age Mooney scorch protection $t_{10}$ time (minutes) | |
|---|---|---|---|---|---|---|
| | Pentaerythritol | Oil | Surface active agent | Metallic soap | Original | After 6 days at 50° C. |
| Maglite D: | | | | | | |
| 50 | | 45 | 3.5 | 1.5 | 40 | 25 |
| 47.5 | 2.5 | 45 | 3.5 | 1.5 | 43 | 30 |
| 45 | 5 | 45 | 3.5 | 1.5 | 43 | 30 |
| 40 | 10 | 45 | 3.5 | 1.5 | 44 | 32 |
| Compared with a Maglite D powder | | | | | 36 | 25 |

The example shows that the dispersions of the invention give better performance than either powder or a dispersion without pentaerythritol.

EXAMPLE III

Similarly a dispersion can be prepared and evaluated using the following composition:

| | Weight percent |
|---|---|
| MgO | 50 |
| Pentaerythritol | 2.5 |
| Surface active agent | 47.5 |

EXAMPLE IV

Dispersions of MgO are made in a dispersing medium consisting of a naphthenic petroleum oil (Shellflex 371) and a technical grade of pentaerythritol monoricinoleate. These dispersions are used in neoprene at a level of 4 phr and the performance is compared with Maglite D powder at 4 phr.

| Dispersion composition (weight percent) | | | Original and bin age Mooney scorch protection $t_{10}$ time (minutes) | |
|---|---|---|---|---|
| Maglite D | Pentaerythritol mono-ricinoleate | Oil | Original | After 6 days at 50° C. |
| 50 | 3 | 47 | 45 | 33 |
| 50 | 5 | 45 | 43 | 37 |
| 50 | 7 | 43 | 44 | 38 |
| 100 (Maglite D powder) | | | 38 | 34 |

The example shows that the use of pentaerythritol mono-ricinoleate enhances the performance of MgO dispersions to give a performance equal to or better than the powder.

EXAMPLE V

MgO is dispersed in a dispersing medium consisting of a naphthenic petroleum oil (Shellflex 371), a technical grade of pentaerythritol mono-ricinoleate and one or more of the following: sorbitan mono-oleate (surface active agent), pentaerythritol tetra-stearate (surface active agent) and pentaerythritol.

The dispersions are used in neoprene at a level of 4 phr. and the performance is compared with Maglite D powder at 4 phr.

| Composition (weight percent) | | | | | | Original and bin age Mooney scorch protection $t_{10}$ time (minutes) | |
|---|---|---|---|---|---|---|---|
| Maglite D | Pentaerythritol mono-ricinoleate | Sorbitan mono-oleate | Pentaerythritol tetra-stearate | Pentaerythritol | Oil | Original | After 6 days at 50° C. |
| 50 | 5 | 5 | | | 40 | 45 | 38 |
| 50 | 5 | | 5 | | 40 | 44 | 39 |
| 50 | 5 | | | 5 | 40 | 43 | 39 |
| 50 | 5 | 5 | 5 | 5 | 35 | 45 | 39 |
| 100 (Maglite D powder) | | | | | | 38 | 34 |

The above example demonstrates the use of pentaerythritol solely or in combination with esters of pentaerythritol to enhance the performance of MgO dispersions.

EXAMPLE VI

In this example, the performance of an MgO dispersion of this invention using pentaerythritol mono-ricinoleate, is compared with MgO powder. In previous examples, the neoprene test compound was mixed on an open rubber mill. In this example, the neoprene test compound was mixed in an internal mixer (Banbury, type 00). Maglite D powder and dispersion are each used at 4 phr. in neoprene.

Dispersion composition:

| | Percent |
|---|---|
| Maglite D | 55.6 |
| Naphthenic petroleum oil | 31.1 |
| Sorbitan mono-oleate | 2.7 |
| Calcium stearate | 1.8 |
| Pentaerythritol | 4.4 |
| Pentaerythritol mono-ricinoleate | 4.4 |

Performance in neoprene comparison:

| MgO | Original and bin age Mooney scorch protection $t_{10}$ time (minutes) | |
|---|---|---|
| | Original | After 6 days at 50° C. |
| Dispersion | 46 | 43 |
| Maglite D powder | 38 | 29 |

The above example is further evidence of the improvement in performance employing the dispersions of the invention.

EXAMPLE VII

Illustrative of the dispersions that may be employed in the practice of the invention are the following:

| | Percent |
|---|---|
| MgO | 54.0 |
| Naphthenic process oil | 36.0 |
| Picco 6100–1 1/2 | 3.0 |
| Pentaerythritol mono-ricinoleate | 3.0 |
| Sorbitan mono-oleate | 2.5 |
| Calcium stearate | 1.5 |

| | Percent |
|---|---|
| MgO | 52.0 |
| Naphthenic process oil | 43.0 |
| Pentaerythritol mono-stearate | 2.5 |
| Pentaerythritol tetra-stearate | 2.5 |

| | Percent |
|---|---|
| MgO | 50.0 |
| Naphthenic process oil | 45.0 |
| Pentaerythritol tri-stearate | 5.0 |

| | Percent |
|---|---|
| MgO | 53.0 |
| Naphthenic process oil | 34.0 |
| Picco 6100–1 1/2 | 4.0 |
| Pentaerythritol di-oleate | 5.0 |
| Nonylphenoxypoly (ethyleneoxy) ethanol | 4.0 |

| | Percent |
|---|---|
| MgO | 56.0 |
| Butyloleate | 35.0 |
| Polybutene No. 128 (Oronite) | 2.5 |
| Glycerol monostearate | 3.0 |
| Pentaerythritol di-laurate | 3.5 |

| | Percent |
|---|---|
| MgO | 55.0 |
| Dibutyl phthalate | 30.0 |
| Vistanex LM-MH | 4.0 |
| Nonylphenyl polyglycol ether (Tergitol NPX) | 5.0 |
| Pentaerythritol di-acetate | 6.0 |

| | Percent |
|---|---|
| MgO | 52.0 |
| Paraffinic petroleum oil (Cyclolube 2310) | 33.0 |
| Al-stearate | 2.0 |
| Alkyl aryl sulfonate (Atlas G–3300) | 6.0 |
| Pentaerythritol mono-acrylate | 7.0 |

| | Percent |
|---|---|
| MgO | 52.0 |
| Shellflex 371 | 31.5 |
| Fully refined wax 138/140 (Mobil) | 2.5 |
| Microcrystalline wax Mobil wax 2305 BR | 2.5 |
| Polyethylene glycol (Carbowax 4000) | 5.0 |
| Pentaerythritol tri-sorbate | 7.5 |
| MgO | 51.0 |
| Linseed oil | 33.5 |
| Polyethylene AC 617 | 5.0 |
| Emulphor VN–430 | 6.0 |
| Pentaerythritol-monobenzoate | 4.5 |
| MgO | 75.0 |
| Shellflex 371 | 16.0 |
| Picco 6100–1 1/2 | 2.0 |
| Pentaerythritol mono-ricinoleate | 4.0 |
| Sorbitan mono-oleate | 2.5 |
| Calcium stearate | 1.5 |

Preparation of stick or bar form of pentaerythritol containing MgO dispersion

After the dispersion is prepared by high shear mixing, the hot dispersion is extruded through a hot extruder. The extruded stick is then cut into the desired lengths, and cooled to room temperature.

Preparation of pellet form of pentaerythritol containing MgO dispersion

Pellets are prepared by adding the hot dispersing medium to the powder while it is being mixed slowly at about 100° C. Just enough dispersing medium is added to make the particles coalesce.

When certain representative embodiments and details have been shown for the purpose of illustrating the invention it will be apparent to those skilled in this art that various changes and modifications may be made therein without departing from the spirit or scope of the invention.

What is claimed is:

1. A composition for use in the compounding and processing of chloroprene polymers comprising pentaerythritol or the mono-, di- and tri-esters thereof wherein the acid residue is derived from an aliphatic acid moiety of from about 1 to 18 carbon atoms, benzoic acid or phthalic acid or mixtures thereof and a dispersion of MgO wherein there is present from about 2 to about 100 parts by weight of pentaerythritol or the esters thereof per hundred parts by weight of MgO and from about 5 to 200 parts by weight of dispersing medium per hundred parts by weight of MgO.

2. The composition according to claim 1 wherein the dispersing medium comprises at least one rubber plasticizer; at least one ionic or non-ionic surface active agent or mixtures thereof or a mixture of at least one rubber plasticizer with at least one ionic or non-ionic surface active agent or mixtures thereof and the pentaerythritol material is selected from the group consisting of pentaerythritol and the mono-, di- and tri-esters thereof wherein the acid residue is derived from an acid selected from the group consisting of formic, acetic, acrylic, glycoxylic, acetoacetic, maleic, adipic, methacrylic, heptanoic, pivalic, nonanoic, azelaic, glycolic, benzoic and phthalic or mixtures thereof.

3. The composition according to claim 2 wherein the pentaerythritol material is at least one member selected from the group consisting of pentaerythritol, pentaerythritol monosterate, pentaerythritol disterate, pentaerythritol tristearate, pentaerythritol monooleate, pentaerythriol tristearate, pentaerythriol monooleae, penaerythritol monoricinoleate, pentaerythritol diricinoleate, pentaerythritol triricinoleate, pentaerythritol monopalmitate, pentaerythritol dipalmitate, pentaerythritol tripalimitate, pentaerythritol monolaurate, pentaerythritol dilaurate, pentaerythritol trilaurate, pentaerythritol monolinoleate, pentaerythritol dilinoleate and pentaerythritol trilinoleate.

4. The composition according to claim 3 wherein the pentaerythritol material is at least one member selected from the group consisting of pentaerythritol, pentaerythritol monosterate, pentaerythritol distearate, pentaerythritol tristearate, pentaerythritol monooleate, pentaerythritol dioleate and pentaerythritol monoricinoleate.

5. The composition according to claim 4 wherein the dispersing medium comprises at least one rubber plasticizer.

6. The composition according to claim 5 wherein the rubber plasticizer is a petroleum oil.

7. The composition according to claim 6 wherein the rubber plasticizer is a petroleum oil and a coumarone indene resin.

8. The composition according to claim 4 wherein the dispersing medium is a mixture of at least one rubber plasticizer and at least one ionic or non-ionic surface active agent or mixtures thereof.

9. The composition according to claim 8 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap and the rubber plasticizer is a petroleum oil or a petroleum oil and a coumarone indene resin.

10. The composition according to claim 9 wherein the nonionic surface active agent is a sorbitan fatty acid ester and the ionic surface active agent is a metallic soap and the rubber plasticizer is a naphthenic petroleum oil or a naphthenic petroleum oil and a coumarone indene resin.

11. The composition according to claim 10 wherein the surface active agent is a mixture of sorbitan monooleate and calcium stearate.

12. The composition according to claim 9 wherein the surface active agent is nonylphenoxypoly(ethyleneoxy) ethanol and the rubber plasticizer is a naphthenic petroleum oil or a naphthenic petroleum oil and a coumarone indene resin 13. The composition of claim 11 wherein the pentaerythritol material is pentaerythritol.

14. The composition of claim 12 wherein the pentaerythritol material is pentaerythritol.

15. A process of producing a vulcanizable chloroprene polymer which comprises the addition of pentaerythritol or the mono-, di- and tri-esters thereof wherein the acid residue is derived from an aliphatic acid moiety of from about 1 to 18 carbon atoms, benzoic acid or phthalic acid or mixtures thereof and a dispersion of MgO to a composition comprising chloroprene polymer wherein there is present from about 2 to about 100 parts by weight of pentaerythritol per hundred parts by weight of MgO, from about 5 to 200 parts by weight of dispersing medium per hundred parts by weight of MgO wherein the MgO, pentaerythritol or the esters thereof and dispersing medium is present in the amount of from about 2 to about 16 parts by weight per hundred parts by weight of polymer.

16. The process according to claim 15 wherein the dispersing medium comprises at least one rubber plasticizer; at least one ionic or non-ionic surface active agent or mixtures thereof or a mixture of at least one rubber plasticizer with at least one ionic or non-ionic surface active agent or mixtures thereof and the pentaerythritol material is selected from the group consisting of pentaerythritol and the mono-, di- and tri-esters thereof wherein the acid residue is derived from an acid selected from the group consisting of formic, acetic, acrylic, glycoxylic, acetoacetic, maleic, adipic, methacrylic, heptanoic, pivalic, nonanoic, azelaic, glycolic, benzoic and phthalic or mixtures thereof.

17. The process according to claim 16 wherein the pentaerythritol material is at least one member selected from the group consisting of pentaerythritol, pentaerythritol monostearate, pentaerythritol distearate, pentaerythritol tristearate, pentaerythritol monooleate, pentaerythritol dioleate, pentaerythritol trioleate, pentaerythritol monoricinoleate, pentaerythritol diricinoleate, pentaerythritol triricinoleate, pentaerythritol monopalmitate, pentaerythritol dipalmitate, pentaerythritol tripalmitate, pentaerythritol monolaurate, pentaerythritol dilaurate, pentaerythritol trilaurate, pentaerythritol monolinoleate, pentaerythritol dilinoleate and pentaerythritol trilinoleate.

18. The process according to claim 17 wherein the pentaerythritol material is at least one member selected from the group consisting of pentaerythritol, pentaerythritol monostearate, pentaerythritol distearate, pentaerythritol tristearate, pentaerythritol monooleate, pentaerythritol dioleate and pentaerythritol monoricinoleate.

19. The process according to claim 18 wherein the dispersing medium comprises at least one rubber plasticizer.

20. The process according to claim 19 wherein the rubber plasticizer is a petroleum oil.

21. The process according to claim 20 wherein the rubber plasticizer is a petroleum oil and a coumarone indene resin.

22. The process according to claim 18 wherein the dispersing medium is a mixture of at least one rubber plasticizer and at least one ionic or non-ionic surface active agent or mixtures thereof.

23. The process according to claim 22 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate sulfonate or a metallic soap and the rubber plasticizer is a petroleum oil or a petroleum oil and a coumarone indene resin.

24. The process according to claim 23 wherein the nonionic surface active agent is a sorbitan fatty acid ester and the ionic surface active agent is a metallic soap and the rubber plasticizer is a naphthenic petroleum oil or a naphthenic petroleum oil and a coumarone indene resin.

25. The process according to claim 24 wherein the surface active agent is a mixture of sorbitan monooleate and calcium stearate.

26. The process according to claim 23 wherein the surface active agent is nonylphenoxypoly (ethyleneoxy) ethanol and the rubber plasticizer is a naphthenic petroleum oil or a naphthenic petroleum oil and a coumarone indene resin.

27. The process of claim 25 wherein the pentaerythritol material is pentaerythritol.

28. The process of claim 26 wherein the pentaerythritol material is pentaerythritol.

29. A bar or pellet for use in the compounding and processing of chloroprene polymers comprising pentaerythritol or the mono-, di- and tri-esters thereof wherein the acid residue is derived from an aliphatic acid moiety of from about 1 to 18 carbon atoms, benzoic acid or phthalic acid or mixtures thereof and a dispersion of MgO wherein there is present from about 2 to about 100 parts by weight of pentaerythritol or the esters thereof per hundred parts by weight of MgO, from about 5 to 200 parts by weight of dispersing medium per hundred parts by weight of MgO.

30. The bar or pellet according to claim 29 wherein the dispersing medium comprises at least one rubber plasticizer; at least one ionic or non-ionic surface active agent or mixtures thereof or a mixture of at least one rubber plasticizer with at least one ionic or non-ionic surface active agent or mixtures thereof and the pentaerythritol material is selected from the group consisting of pentaerythritol and the mono-, di- and tri-esters thereof wherein the acid residue is derived from an acid selected from the group consisting of formic, acetic, acrylic, glycoxylic, acetoacetic, maleic, adipic, methacrylic, heptanoic, pivalic, nonanoic, azelaic, glycolic, benzoic and phthalic or mixtures thereof.

31. The bar or pellet according to claim 30 wherein the pentaerythritol material is at least one member selected from the group consisting of pentaerythritol, pentaerythritol monostearate, pentaerythritol distearate, pentaerythritol tristearate, pentaerythritol monooleate, pentaerythritol dioleate, pentaerythritol trioleate, pentaerythritol monoricinoleate, pentaerythritol diricinoleate, pentaerythritol triricinoleate, pentaerythritol monopalmitate, pentaerythritol dipalmitate, pentaerythritol tripalmitate, pentaerythritol monolaurate, pentaerythritol dilaurate, pentaerythritol trilaurate, pentaerythritol monolinoleate, pentaerythritol dilinoleate and pentaerythritol trilinoleate.

32. The bar or pellet according to claim 31 wherein the pentaerythritol material is at least one member selected from the group consisting of pentaerythritol, pentaerythritol monostearate, pentaerythritol distearate, pentaerythritol tristearae, pentaerythritol monooleate, pentaerythritol dioleate and pentaerythritol monoricinoleate.

33. The bar or pellet according to claim 32 wherein the dispersing medium comprises at least one rubber plasticizer.

34. The bar or pellet according to claim 33 wherein the rubber plasticizer is a petroleum oil.

35. The bar or pellet according to claim 34 wherein the rubber plasticizer is a petroleum oil and a coumarone indene resin.

36. The bar or pellet according to claim 32 wherein the dispersing medium is a mixture of at least one rubber plasticizer and at least one ionic or non-ionic surface active agent or mixtures thereof.

37. The bar or pellet according to claim 30 wherein the nonionic surface active agent is selected from the group consisting of sorbitan fatty acid esters, polyoxyethylene sorbitan fatty acid esters, polyoxyethylene orbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent as an alkyl aryl sulfonate or a metallic soap and the rubber plasticizer is a petroleum oil or a petroleum oil and a coumarone indene resin.

38. The bar or pellet according to claim 37 wherein the nonionic surface active agent is a sorbitan fatty acid ester and the ionic surface active agent is a metallic soap and the rubber plasticizer is a naphthenic petroleum oil or a naphthenic petroleum oil and a coumarone indene resin.

39. The bar or pellet according to claim 38 wherein the surface active agent is a mixture of sorbitan monooleate and calcium stearate.

40. The bar or pellet according to claim 37 wherein the surface active agent is nonylphenoxypoly (ethyleneoxy) ethanol and the rubber plasticizer is a naphthenic petroleum oil or a naphthenic petroleum oil and a coumarone indene resin.

41. The bar or pellet of claim 39 wherein the pentaerythritol material is pentaerythritol.

42. The bar or pellet of claim 40 wherein the pentaerythritol material is pentaerythritol.

References Cited

UNITED STATES PATENTS 2,567,117   9/1951   Mochel _____ 260—92.3

MAURICE J. WELSH, Primary Examiner

U.S. Cl. X.R.

252—182, 188.3, 309; 260—23.7 H, 33.6 AQ, 92.3

UNITED STATES PATENT OFFICE
CERTIFICATE OF CORRECTION

Patent No. 3,810,856  Dated May 14, 1974

Inventor(s) Albert J. Dalhuisen and William H. Deis

It is certified that error appears in the above-identified patent and that said Letters Patent are hereby corrected as shown below:

Column 15, Claim 3, line 4 delete [disterate] and substitute therefor -- distearate --.

Column 15, Claim 3, line 5 should read:

-- tristearate, pentaerythritol monooleate, pentaerythritol --.

Column 15, Claim 3, line 6 should be deleted.

Column 16, Claim 4, line 2 delete [monosterate] and substitute therefor -- monostearate --.

Column 15, Claim 3, line 9 delete [tripalimitate] and substitute therefor -- tripalmitate --.

Column 17, Claim 23, line 10 delete [sulfonate] the second time it appears.

Column 17, Claim 25, line 2 delete [monoleate] and substitute therefor -- monooleate --.

Column 18, Claim 37, line 4 delete [orbitol] and substitute therefor -- sorbitol --.

Column 18, Claim 37, line 9 delete [as] and substitute therefor -- is --.

Column 18, Claim 32, line 5 delete [tristearae] and substitute therefor -- tristearate --.

Signed and sealed this 15th day of October 1974.

(SEAL)
Attest:

McCOY M. GIBSON JR.
Attesting Officer

C. MARSHALL DANN
Commissioner of Patents